United States Patent
Diduck

(12) 
(10) Patent No.: US 6,443,133 B1
(45) Date of Patent: Sep. 3, 2002

(54) FUEL TEMPERATURE CONTROLLER

(75) Inventor: Victor J. Diduck, Vernon (CA)

(73) Assignee: Aircare International, Inc., Stateline, NV (US)

( * ) Notice: Subject to any disclaimer, the term of this patent is extended or adjusted under 35 U.S.C. 154(b) by 0 days.

(21) Appl. No.: 09/918,493

(22) Filed: Aug. 1, 2001

(51) Int. Cl.[7] .............................. F01M 31/00
(52) U.S. Cl. ...................... 123/557; 123/549
(58) Field of Search ................ 123/549, 557

(56) References Cited

U.S. PATENT DOCUMENTS

| | | | | |
|---|---|---|---|---|
| 4,582,040 A | * | 4/1986 | Niblett | 123/557 |
| 4,754,741 A | * | 7/1988 | Houtman | 123/549 |
| 5,218,944 A | * | 6/1993 | Leonard | 123/557 |
| 5,443,053 A | * | 8/1995 | Johnson | 123/557 |
| 5,809,980 A | * | 9/1998 | Diduck | 123/549 |

* cited by examiner

*Primary Examiner*—Marguerite McMahon
(74) *Attorney, Agent, or Firm*—Hall, Priddy, Myers & Vande Sande

(57) ABSTRACT

The invention disclosed provides a heat exchanger apparatus for heating a fuel, which comprises a heat exchanger block made of a heat conductive material. The heat exchanger block contains a passageway in which is located a heating element operative to heat the heat exchanger block. A fuel conduit in contact with the surface of the heat exchanger block conducts heat from the block to the fuel flowing within. The heat exchanger block is shaped in order to maximize the surface area in contact with the fuel conduit.

9 Claims, 3 Drawing Sheets

FUEL TEMPERATURE CONTROLLER

FIELD

The present invention relates to an apparatus for heating a fuel to a predetermined temperature with a heat exchanger.

BACKGROUND

Hydrocarbon based fuels such as gasoline, kerosene, and diesel fuel, are more efficient if they are heated prior to combustion. The efficiency and engine performance is increased while the exhaust emissions are decreased as the temperature of the fuel is raised. In colder temperatures, the fuel has long chain hydrocarbons and waxes, such as laquers, which form molecules that become progressively larger with decreasing temperature until the fuel gels. Even if the fuel is flowing, the long chain hydrocarbons and waxes may be large resulting in limited atomization. Heating the fuel increases the vaporization of these molecules.

U.S. Pat. No. 5,443,053, issued to Johnson, discloses a fuel heater with a heat exchanger that employs an engine heated coolant fluid or an electric immersion heater as a source of heat. U.S. Pat. No. 5,218,944, issued to Leonard, discloses a fuel preheating system that also employs engine heated coolant fluid to preheat the fuel. The preheated fluid is then mixed with cooled or unheated fuel to produce the fuel temperature required for optimum performance. Canadian Patent No. 960,534, issued to Zuk, discloses winding a copper fuel line around a portion of a copper coolant fluid line conducting coolant heated by the engine to preheat gasoline. Canadian Patent No. 1,015,234, issued to Lebowitz et al., discloses the use of a heat exchanger and heated coolant fluid to raise the temperature of the fuel.

Fuel heaters which use engine coolant as a heat source and are comprised of a tube carrying fuel arranged around a chamber filled with the engine coolant are known to heat fuel to temperatures which very substantially. Accordingly, there is a need for an improved apparatus for preheating a fuel to an optimum temperature.

SUMMARY

The invention disclosed provides an apparatus for heating a fuel, which comprises a block of heat conductive material. The heat exchanger block contains a passageway in which is located a heating element operative to heat the block. A fuel conduit in contact with the surface of the heat exchanger block conducts heat from the heat exchanger block to the fuel flowing within. The heat exchanger block is shaped in order to maximize the surface area in contact with the tubing or fuel conduit. The fuel conduit is made of copper or aluminum.

Advantageously, the apparatus includes a temperature sensor, which senses the temperature of the fuel passing through the fuel conduit and flowing out of the output of the fuel conduit. The sensor may be coupled to a controller that adjusts the current flow through the heating element when the temperature of the fuel falls above or below a predetermined upper or lower limit, respectively.

The apparatus may include a casing around the heat exchanger block and fuel conduit to minimize heat loss. The casing may contain or be formed of a heat insulating material, such as nylon.

By using only a ceramic heat exchanger block that has a heating coil within directly contacting the fuel conduit over an appreciable portion of the latter, high heat conductivity to the fuel is established with a relatively low heat capacity attributable primarily to the ceramic heat exchanger block. As a result, a fast response time to temperature change requests is achieved. Unlike prior art systems, there is no need to heat up a large amount of material within the apparatus with the large associated heat capacity of that material. As a result, response time in the present invention is maximized.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE INVENTION

Figure 1:
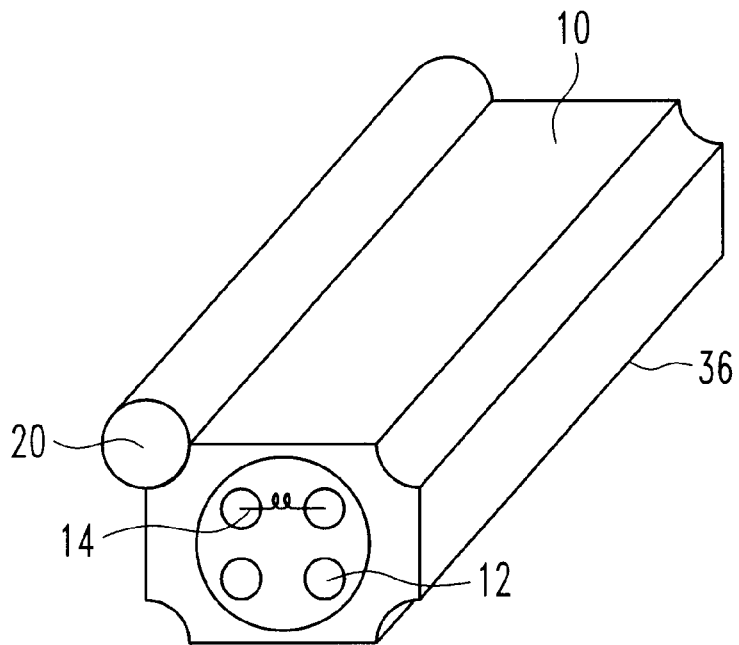
FIG. 1 is a perspective view of the heat exchanger block.

Referring to FIG. 1, the heat exchanger apparatus 36 is comprised of a heat exchanger block 10, with interior passageways 12 containing a heating element 14. A fuel conduit 20 made of copper passes around the heat exchanger block 10 in contact with the exterior surface of the block 10. The elongated edges of the heat exchanger block 10 are of a rounded concave shape to maximize surface contact with the fuel conduit for efficient heat transfer. In the embodiment shown, the end of the heat exchanger block 10 is recessed to protect the exposed portion of the heating element 14. Fuel flows through the fuel conduit 20 and is heated by the direct contact between the fuel conduit 20 and the heat exchanger block 10.

Figure 2:
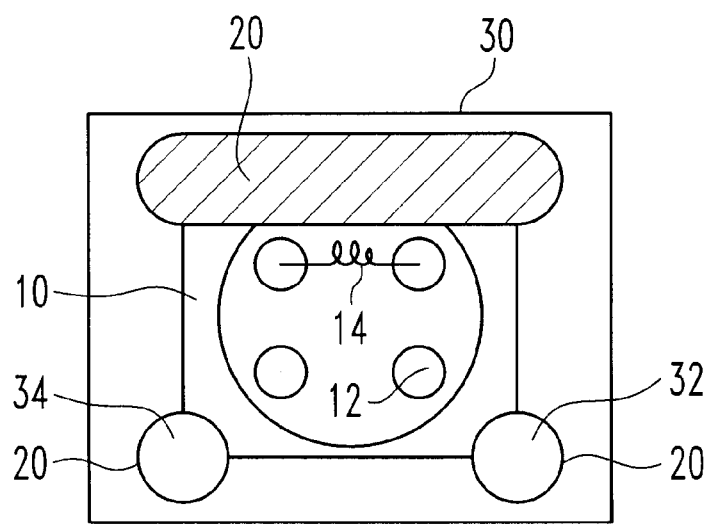
FIG. 2 is an end view of the heat exchanger block with adjacent fuel conduit.

Referring to FIG. 2, the fuel conduit 20 surrounds the heat exchanger block 10. A casing 30 encloses the heat exchanger block 10 and fuel conduit 20, with input 32 and output 34 apertures for the fuel conduit and for connection of the heating element 14 to a power source. The input 32 and output 34 for the fuel conduit 20 extend beyond the front edge of the heat exchanger block 10 and pass through the casing 30 for connection with the main fuel line (not shown).

Figure 3:
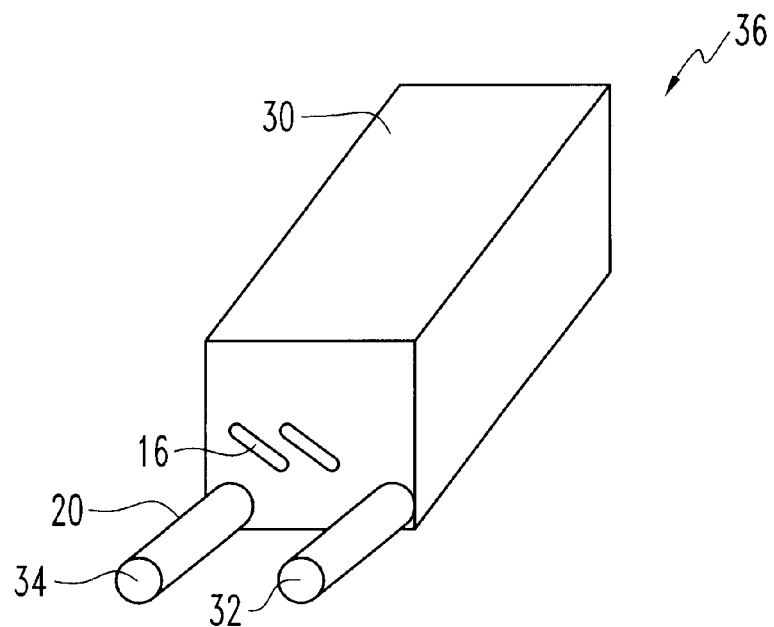
FIG. 3 is a perspective view of the encased apparatus.

The encased heat exchanger apparatus 36 in FIG. 3 has the input 32 and output 34 for the fuel conduit 20 and the leads 16 for connection of the heating element 14 to a power supply 22 (see FIG. 4) as the only visible components.

Figure 4:
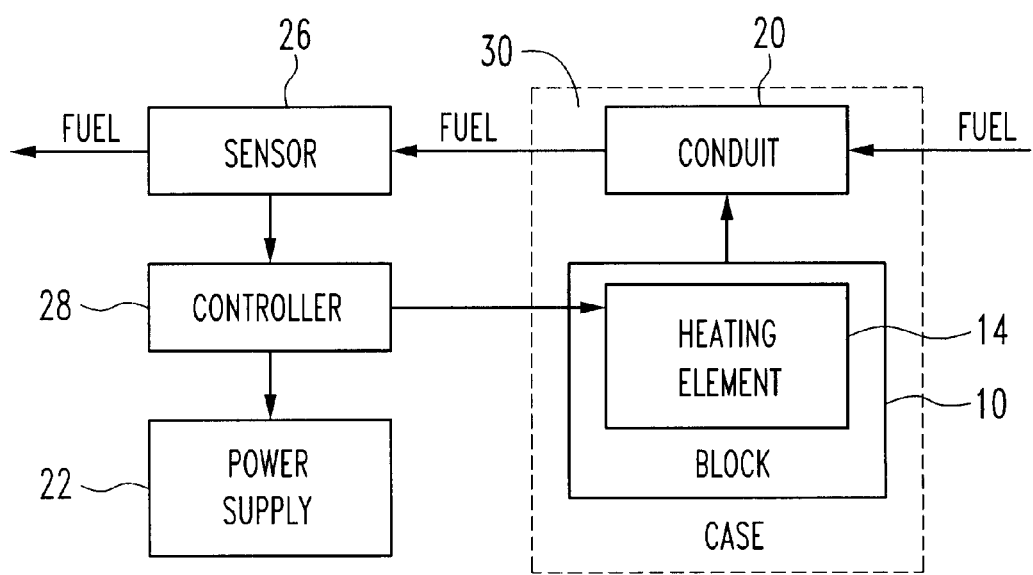
FIG. 4 is a schematic view of the apparatus including a sensor and control panel.

The apparatus in FIG. 4 includes a temperature sensor 26 and a controller 28. The sensor 26 measures the temperature of the fuel at the output 34 of the fuel conduit 20 and relays that information to the controller 28. The controller 28 then adjusts the current flow to the heating element 14 in response to the measured temperature as compared to a predetermined upper and lower limit. In this embodiment, the controller 28 is connected in series with the heating element 14 to a power source 22.

Figure 5:
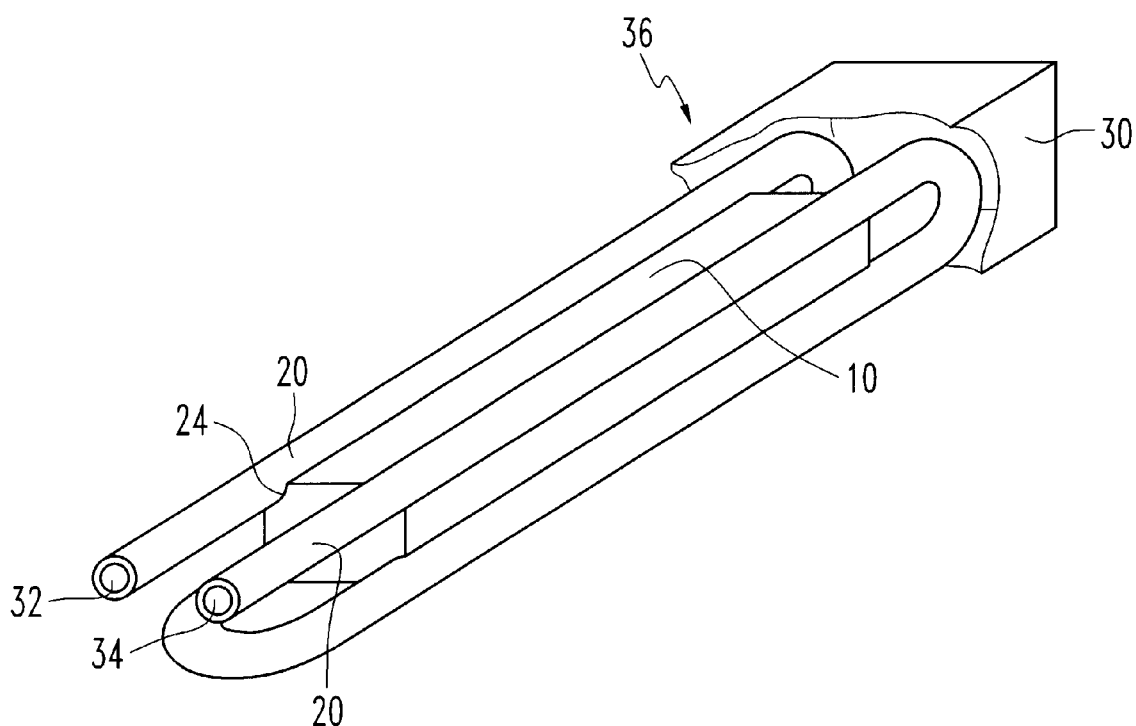
FIG. 5 is a perspective view of the heat exchanger block with adjacent fuel conduit.

Referring to FIG. 5, the fuel conduit 20 contacts the heat exchanger block 10 along each one of four partially elongated cylindrical surfaces 24. With each fuel conduit 20 interconnected to an adjacent fuel conduit 20 with integral curved tubular sections so that fuel entering the input 32 passes down four straight elongated sections where heat is extracted by the heat exchanger block 10 with the heated fuel exiting from output 34. An insulating casing 30 (see FIG. 3) fits over the entire assembly.

By using a heat exchanger block 10 in contact with an appreciable portion of the fuel conduit 20, good heat transfer from the heat exchanger block 10 to the fuel is achieved with relatively small heat capacity due only to the mass of the heat exchanger block 10. As a result a fast response time to temperature adjustment is achieved.

It can be shown that the rate of temperature change, $R_T$, is proportional to $L^2/D$ where L is the length of the heat exchanger and D is the diameter of the fuel conduit 20. Accordingly, maximizing the length of the heat exchanger block 10 to provide a long, narrow profile maximizes the rate of temperature change of fluid flowing in the fuel conduit.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed:

1. An apparatus for heating a fuel comprising:
   a) a heat exchanger block made of a heat conductive material and having an interior passageway,
   b) a heating element in said passageway operative to heat said block,
   c) a fuel conduit contacting an exterior surface of said block operative to conduct heat from said block to fuel flowing through said fuel conduit, and
   d) said block having a contoured shape to maximize the contact area between said exterior surface of said block and said fuel conduit.

2. Apparatus according to claim 1, wherein said fuel conduit is composed of copper.

3. Apparatus according to claim 1, including a temperature sensor operative to sense the temperature of fuel in said fuel conduit.

4. Apparatus according to claim 3, including a controller coupled to said sensor and said controller operative to adjust the current flow to said heating element when the fuel temperature rises above a predetermined upper or falls below a lower threshold.

5. Apparatus according to claim 1, including a casing enclosing said block and said fuel conduit, operative to minimize heat loss.

6. Apparatus according to claim 5, wherein said casing is composed of a heat insulating material.

7. Apparatus according to claim 5, wherein said heat exchanger block is substantially longer than its width.

8. Apparatus according to claim 1, wherein said heat exchanger block is ceramic.

9. Apparatus according to claim 6, wherein said casing is nylon.

* * * * *